(12) United States Patent
Rohaly (10) Patent No.: US 7,606,424 B2
(45) Date of Patent: Oct. 20, 2009

(54) COMBINED FORWARD AND REVERSE CORRELATION

(75) Inventor: Janos Rohaly, Acton, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 693 days.

(21) Appl. No.: 11/421,573

(22) Filed: Jun. 1, 2006

(65) Prior Publication Data

US 2007/0189637 A1    Aug. 16, 2007

Related U.S. Application Data

(60) Provisional application No. 60/773,253, filed on Feb. 13, 2006.

(51) Int. Cl.
*G06K 9/62* (2006.01)
(52) U.S. Cl. .............. 382/209; 382/219; 382/220; 382/218; 382/216
(58) Field of Classification Search ........ 382/209, 382/216, 218, 219, 220
See application file for complete search history.

(56) References Cited

U.S. PATENT DOCUMENTS

| 5,537,494 A | 7/1996 | Toh |
|---|---|---|
| 5,734,743 A | 3/1998 | Matsugu et al. |
| 6,094,501 A | 7/2000 | Beatty |
| 6,301,370 B1 * | 10/2001 | Steffens et al. ............ 382/103 |
| 6,784,427 B1 | 8/2004 | Grunewald et al. |
| 6,785,427 B1 | 8/2004 | Zhou |

OTHER PUBLICATIONS

Rohaly, Janos et al., "Reverse Hierarchial PIV Processing", *Measurement Science and Technology* 13(7), (2002),984-996.
Davis, Quentin et al., "Statistics of subpixel registration algorithms based on spatiotemporal gradients or block matching", *Optical Engineering* 37(4), (Apr. 1998),1290-1298.
Westerweel, "Fundamentals of digital particle image velocimetry", *Measurement Science and Technology* 8, (1997),1379-1392.
Roesgen, T. "Optimal subpixel interpolation in particle image velocimetry", *Experiments in Fluids* 35(3), (Jun. 26, 2003),252-256.

* cited by examiner

*Primary Examiner*—Matthew C Bella
*Assistant Examiner*—Mike Rahmjoo
(74) *Attorney, Agent, or Firm*—Lance Vietzke (57) ABSTRACT

Improved correlation techniques employ data from forward (template-to-reference) and reverse (reference-to-template) correlation to identify valid correlation peaks, enforce symmetry in correlation peaks, and/or combine forward and reverse correlation data. In embodiments, these techniques eliminate or reduce rms noise in a recovered signal peak location by enforcing correlation peak symmetry. The forward and reverse correlation methods described herein may be used for validation of correlation peaks, detection of outlier data points and improved interpolation, such as for higher accuracy localization of a peak center with sub-pixel resolution.

14 Claims, 7 Drawing Sheets

COMBINED FORWARD AND REVERSE CORRELATION

RELATED APPLICATIONS

This application claims the benefit of U.S. Provisional Application No. 60/773,253 filed on Feb. 13, 2006, the entire contents of which is incorporated herein by reference.

BACKGROUND OF THE INVENTION

1. Field of the Invention

This disclosure relates to the field of signal processing, and more particularly to improving sub-pixel accuracy and valid signal peak detection for data related to motion between images.

2. Description of the Related Art

Local correlation, covariance, and normalized correlation are among the standard techniques used to recover motion between image frames, such as to derive structure from motion, to track the motion of objects, to resolve stereo vision and in particle image velocimetry, among other applications. Depending on the application, higher accuracy and sensitivity can generally be achieved by interpolating the signal correlation peak with an appropriate function that models the local point spread function (PSF) of the imaging system. For example, in case of diffraction-limited imaging the appropriate interpolating function may be the so-called Airy function, while parabolic or Gaussian functions are also frequently used to simplify interpolation. In most cases the interpolation assumes that the signal is symmetrically distributed around the true correlation peak.

At zero image motion, or when computing the auto-correlation, the signal peak is expected to be symmetric in the small neighborhood of the self-correlation peak. This however is only satisfied if the contributing image features are distributed in the examined local area with sufficient space in between them such that no false correlation takes place between the correlated features; that is, a criterion on the spacing or spatial scale can be formulated that leads to a density requirement on the features under homogeneous distribution. This for example can be used to determine what pattern density is best for actual motion detection. For example, if a 3×3 small neighborhood is used for correlation peak interpolation, no false correlation is allowed to contribute to the values in this small neighborhood of the signal peak. However, this constraint can only be satisfied under artificial or highly controlled circumstances. In images of a real scene, the density of features results in significant false correlation contribution to the small neighborhood of the signal peak. This randomly distorts the signal correlation peak such that it makes the peak asymmetric, resulting in a root mean square (rms) noise in the recovered disparity information even under ideal conditions (e.g. ideal images with integer disparity). The use of a smaller sub-image region for correlation results in a larger rms noise due to lower signal-to-noise ratio in the correlation. This effect can be reduced by low-pass filtering the image with an appropriate filter, but cannot be fully eliminated.

Sub-image cross-correlation (normalized covariance and cross-correlation) inherently gives an asymmetric correlation peak as the true signal representing local image motion between two image frames. This results in the aforementioned rms noise in locating the true correlation signal peak with sub-pixel accuracy, which adversely affects measurement precision. Although an interpolation function might be identified to address bias in estimation of the peak location, one of the underlying problems is stochastic noise in the recovered peak location, which may not exhibit any consistent bias. In addition, enforcing correlation peak symmetry may not itself improve a solution that can only be achieved by additional careful examination and adaptation of the signal peak interpolation procedure.

A need exists for techniques to recover motion between image frames that are less susceptible to rms noise problems.

SUMMARY

Improved correlation techniques employ data from forward (template-to-reference) and reverse (reference-to-template) correlation to identify valid correlation peaks, enforce symmetry in correlation peaks, and/or combine forward and reverse correlation data. In embodiments, these techniques eliminate or reduce rms noise in a recovered signal peak location by enforcing correlation peak symmetry. The forward and reverse correlation methods described herein may be used for validation of correlation peaks, detection of outlier data points and improved interpolation, such as for higher accuracy localization of a peak center with sub-pixel resolution.

DETAILED DESCRIPTION

This disclosure relate to analysis of image data, which as used herein should be understood to include a wide range of types of image data, including image data from all types of cameras and vision systems, machine visions systems, stereoscopes, telescopes, endoscopes, microscopes and the like. Image data may include data from the visible spectrum, as well as infrared, ultraviolet, x-ray and other image data, including data from any part of the electromagnetic spectrum. In embodiments image data relates to image frames and may include data related to the motion or disparity of images between two frames, such as frames taken at different times, frames taken from different points of view, or frame data taken from different parts of a vision system (such as different sensors viewing the same object). Image data may be recorded in various forms, such as pixel intensities, variances in pixel intensities, spectral content, and the like. It should also be appreciated that, while the following description emphasizes processing of two-dimensional images, the techniques described herein may also be applied to three-dimensional or other processing. Thus, terms such as "image", "image data", and the like as used herein should be understood to refer more generally to multi-dimensional data or data sets, unless a different meaning is explicitly stated, or otherwise clear from the context.

This disclosure further relates to the correlation of image data, which as used herein should be understood to encompass any method or facility for determining a correlation or relationship between items or sets of single-dimensional or multi-dimensional data, including a pair (or more) of sets of image data, such as, in certain embodiments, data from two image frames. In embodiments, correlation may include various forms, such as local variance, correlations, peaks, symmetric and asymmetric forms of correlation, template-to-reference correlation, error correlation, covariance, normalized correlation, or normalized covariance. Embodiments may further include any known statistical techniques and processes for determining a correlation or matching between two sets of data. Embodiments may include, for example, iterative methods of determining correlation between data sets. Embodiments may include approaches that use cross-correlation, mutual information, normalized mutual information, mean-square difference, ratio image uniformity, and the like.

As used herein, correlation may be understood to encompass forward correlation, as well as reverse, or backward, correlation. Forward correlation should be understood to include correlation techniques for determining a correlation between a first set of data for a template, original, or reference block of data (such as image data for an image) and a second set of data, such as data for a target or search area. Reverse, or backward, correlation should be understood to encompass correlation techniques for determining correlation between data for a target or search area and the template, original or reference block. In embodiments, this reverse correlation may include iterative techniques, as well as techniques that use multiple reverse correlation calculations, such as for multiple search areas with respect to the same template or reference block.

In performing a correlation calculation, one may select a candidate correlation peak that is determined between a pair of images, such as between a template or reference blocks and search areas.

Also disclosed herein are techniques that involve determining motion, which encompasses differences between two sets of image data, such as image frames. Motion, as used herein, should be understood to encompass any such differences, including image disparity, motion vector calculation, average motion, object tracking, stereo parallax, velocimetry and all other applications that relate to differences between images.

The techniques disclosed herein may also be usefully employed in image registration, which should be understood to encompass any kind of technique for transforming sets of data to a common coordinate system, such as to integrate data from distinct measurements, such as from two image frames. In one aspect, the techniques described herein may be usefully employed to improve subpixel resolution of correlation calculations.

Techniques disclosed herein also include validation techniques, which encompass techniques for identifying outlier data or ensuring satisfaction of some threshold extent to which a correlation has been met or has failed to have been met. Embodiments may include, for example, setting a threshold for the extent of deviation in correlation peak locations (or alternatively by setting a threshold on how much motion is allowed in the location of the reverse correlation peak, and comparing the actual peak location to this threshold). Additionally, where image disparity is employed as an intermediate measure of a physical quantity such as depth in a camera coordinate system, the disparity threshold can also be converted to or derived from that quantity.

Also disclosed herein are techniques for enforcing symmetry between correlation peaks, which should be understood to include any techniques for combining data and requiring symmetry between a pair of correlation peaks. Embodiments may include element-by-element averaging of correlation values, element-by-element multiplication of correlation values and combination of correlation table values as if the values are from the same source.

Also disclosed herein are interpolation techniques, which include any suitable techniques for modeling behavior about an image data point or about a statistic based on a mathematical function. Such techniques may include sub-pixel interpolation techniques that use the so called Airy functions, Gaussian distributions, parabolic distributions, splines, point spread functions, or other functions.

Figure 1:
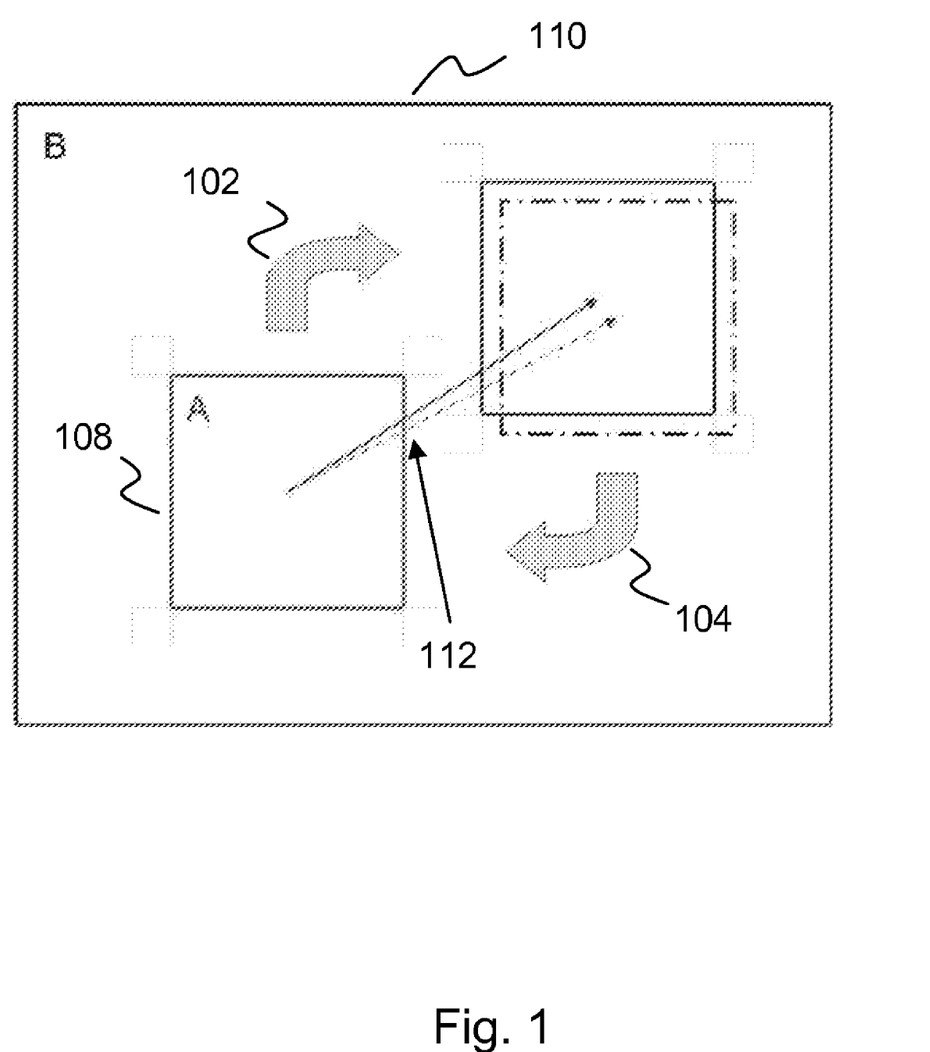
FIG. 1 shows a forward and reverse correlation method in schematic format.

Referring to FIG. 1, disclosed herein are techniques for determining a forward correlation 102 and a reverse correlation 104 between a template block 108 and a search area 110, such as to determine a motion vector 112 between the original image used to define the template block 108 and a target image that is supposed to be located in the search area 110. A motion vector 112 expressed within pixel coordinates of the search area 110 may be an integer motion vector (depicted as a solid line), or a non-integer motion vector, such as a sub-pixel motion vector (depicted as a dash-dotted line). Sub-image correlation techniques, as further described herein, seek the best match of the template block 108 within the larger search area 110. In FIG. 1, it can be seen that two correlation calculations can be made: a conventional forward correlation between the reference and the target area, as well as a second correlation back from the target image that is found in the forward correlation to the original reference area. Additional correlations may also be made.

Figure 2:
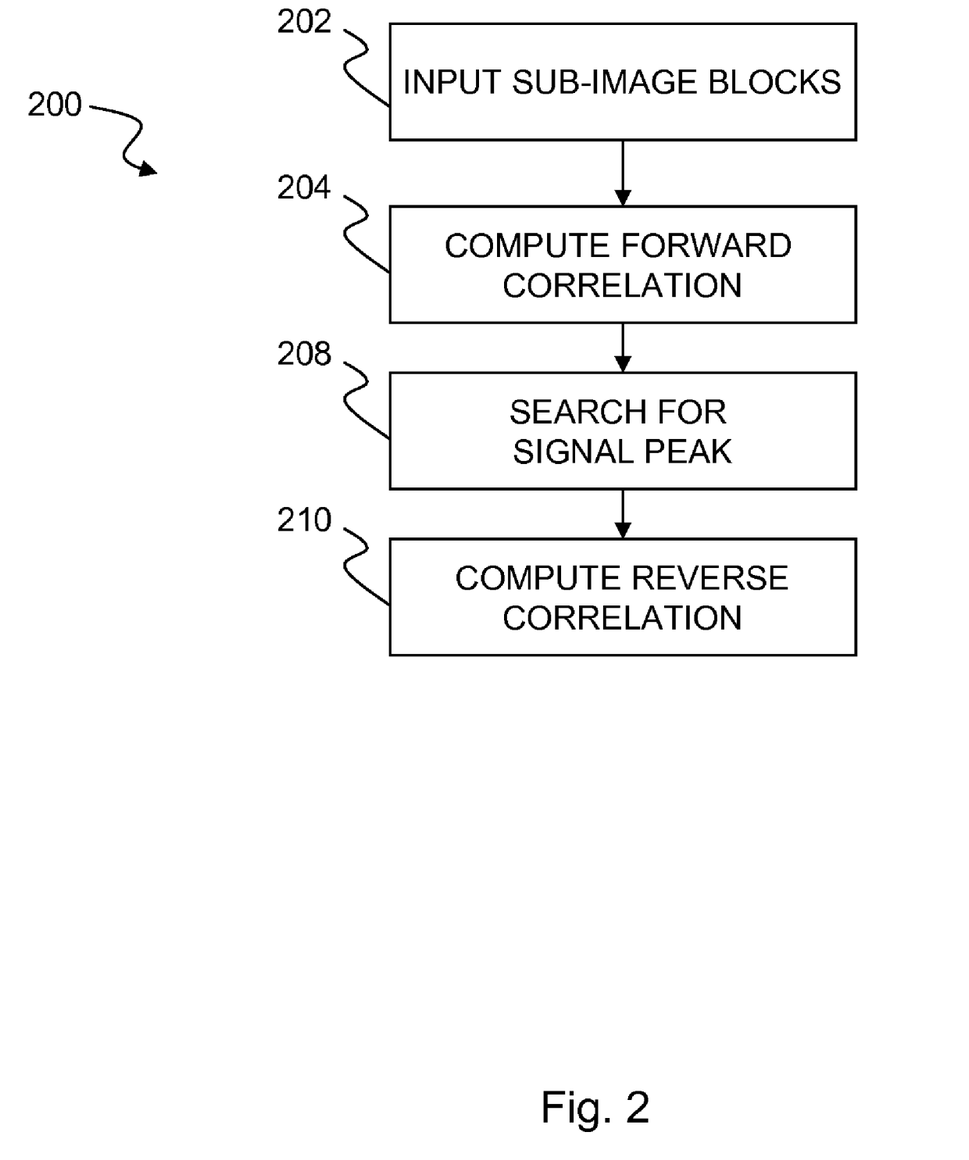
FIG. 2 shows steps in a method for forward and reverse correlation.

Referring to FIG. 2, a flow diagram 200 shows steps for an embodiment of a forward and reverse correlation technique. First, at a step 202, the methods described herein may take input data, such as image or sub-image data from two or more blocks of image data for which it is desired to determine motion between the image blocks. The step 202 preferably includes taking sub-image blocks with search areas large enough to allow correlation, covariance and normalized correlation calculations. These calculations may be performed in the spatial domain and/or the frequency domain. However, in general, the second sub-image area should be larger by the amount of the search area. The step 202 may include taking other forms of input data, as appropriate for any of a wide variety of types of correlation.

As shown in step 204, the methods described herein may include computation of a forward correlation, that is, a correlation between a template, or reference block and a search area in which a target image that correlates to the template, or reference, block within a search area as depicted in FIG. 1.

As shown in step 208, a signal correlation peak can be identified. This peak represents a candidate signal of image data within the search area, and the peak also represents a corresponding candidate determination of the motion between the template (or reference block) and the target image. Certain suitable methods for computation are described in Rohaly, J. et al. (2002), *Meas. Sci. Technol.* 13(7) 984-996, the entirety of which is incorporated by reference herein.

As shown in step 210, a reverse correlation may be computed. This may include calculating a correlation between the target block, such as was determined in step 208, and the original template or reference block that was used in step 204 for the forward correlation calculation. In the reverse correlation calculation, an appropriate search area may be added to the first sub-image block. The step 210 may be performed for more than one target block, and it may be performed iteratively to determine a peak for the reverse correlation. This may include an iterative sub-pixel refinement. For example, a the second frame may be fractionally offset (which may include image data interpolation) before the reverse correlation. The offset may be iteratively and/or incrementally adjusted until the "most symmetric" combined correlation peak is produced. As another example, either the target or the template, or both, may be offset, and the offset may be one-dimensional or multi-dimensional. In certain preferred embodiments, to reduce computational cost this reverse correlation can be limited to the correlation values relevant to an interpolation kernel (e.g. in case of a 3×3 kernel, and in the case of integer block offset only 8 correlation values might be computed (because the center correlation value has already been computed in the forward correlation step), as opposed to all possible correlation values). The correlation peaks may be combined using any suitable technique including averaging, addition, and so forth.

Figure 3:
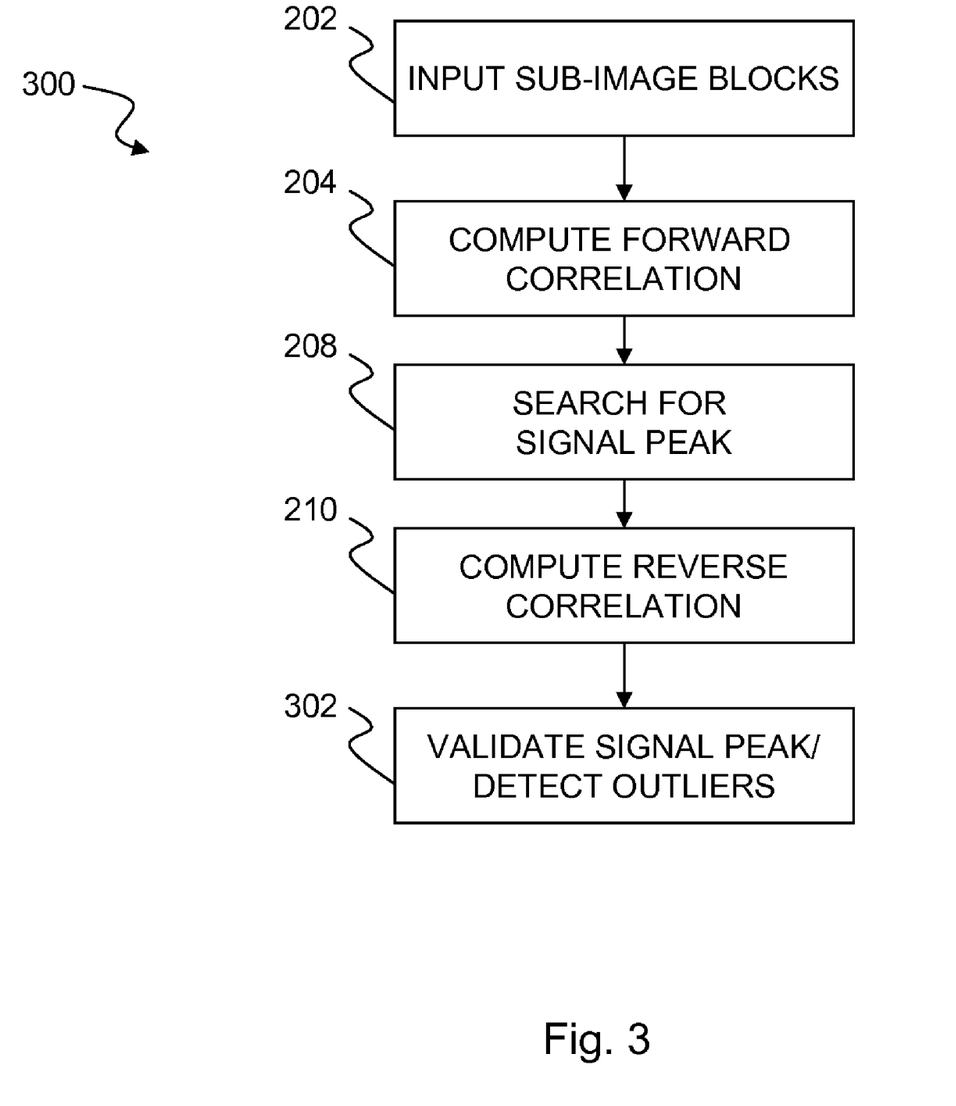
FIG. 3 shows additional optional steps in a method for forward and reverse correlation, including a signal peak validation step.

Referring to FIG. 3, a flow diagram 300 shows certain optional additional steps for one preferred embodiment of a forward and reverse correlation technique. After completion of the forward correlation at the step 204 and the reverse correlation at the step 210, the methods described herein may include a step 302 for validation of the candidate signal peak determined in the forward correlations, including detection of outlier data points. At this step, in addition to standard correlation peak validation techniques (e.g. based on correlation height, symmetry around true correlation peak, and the like) the location of the reverse correlation peak may be compared to the expected location relevant to the selected forward correlation peak. Additionally if correlation with full search range is used, the correlation field pattern around the candidate reverse correlation peak can be compared to that of the forward correlation. For example, the correlation of the forward and backward correlation planes can be performed centered at the candidate peak that should reveal the difference in the two correlation planes.

The step 302 is an optional signal peak validation step based on the notion that reverse correlation gives a peak at a location relevant to the forward correlation. Again, a threshold can be applied on how much deviation in correlation peak location is allowed, such as ascribed to imaging artifacts (e.g. illumination variation, difference in local spatial cut-off frequency, or the like).

Figure 4:
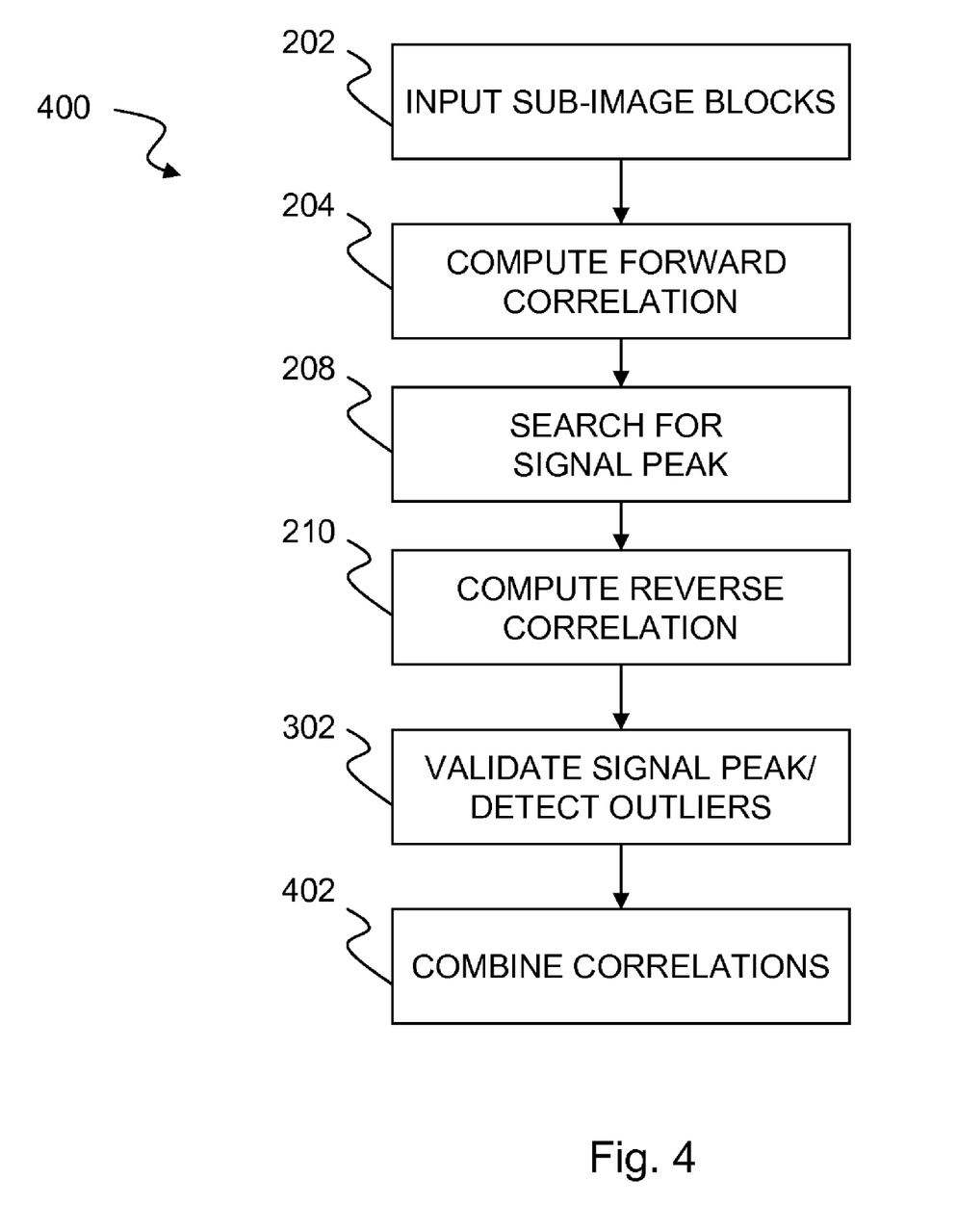
FIG. 4 shows additional optional steps in a method for forward and reverse correlation, including a step in which forward and reverse correlation data are combined.

FIG. 4 shows a flow diagram 400 with certain optional additional steps for an embodiment of a forward and reverse correlation technique. After the computation of the reverse correlation at the step 210 of FIG. 2, or after completion of the optional validation step 302 of FIG. 3, the methods described herein may include a step 402 in which the forward and reverse correlations are combined using any of a variety of techniques known in the art for combining correlations. The process of combining forward and reverse correlation peaks enforces correlation peak symmetry, and hence reduces rms error. Additionally, bias can be reduced by performing multiple reverse correlations and using the several biased disparity results in a model that relates biased disparities to unbiased disparity. Techniques for the latter are described in Davis C Q, Freeman D M (1998) "Statistics of subpixel registration algorithms based on spatiotemporal gradients or block matching," *Optical Engineering* 37 (4): 1290-1298, the entirety of which is incorporated by reference herein.

In certain embodiments, the combination of correlations in step 402 is used to enforce symmetry in the combined correlation peak, based on the assumption that the forward and reverse correlations are symmetric. Symmetry can be enforced, in one embodiment, by element-by-element averaging of correlation values. In another embodiment, symmetry may be obtained by element-by-element multiplication of correlation values (which gives a stronger, sharper signal). In another embodiment symmetry may be enforced by combining correlation tables as if the tables were from the same image data source, as described for example in Rohaly, J. et al. (2002), *Meas. Sci. Technol.* 13(7) 984-996, the entirety of which is incorporated by reference herein.

The above disclosure generally assumes a full correlation where every evaluated disparity location involves two equally sized sub-image regions that are correlated in a specified way to compute a value in a final correlation table. It will be appreciated that various techniques exist for addressing other situations. Performing sub-image correlation on equally sized blocks (either in the spatial or spatial frequency domain) in itself results in zero-biased peak location. Techniques for handling zero-velocity bias are described in J. Westerweel "Fundamentals of digital particle image velocimetry." *Meas. Sci. Technol.* 8 (1997) 1379-1392, the entirety of which is incorporated by reference herein. Various techniques can be used to combine correlation values computed for different image pixels. Certain such techniques are described in an article entitled "*Reverse hierarchical PIV processing*", published Jun. 20, 2002 by J. Rohaly, F. Frigerio and D. P. Hart online at stacks.iop.org/MST/13/984, the entirety of which is incorporated by reference herein.

Figure 5:
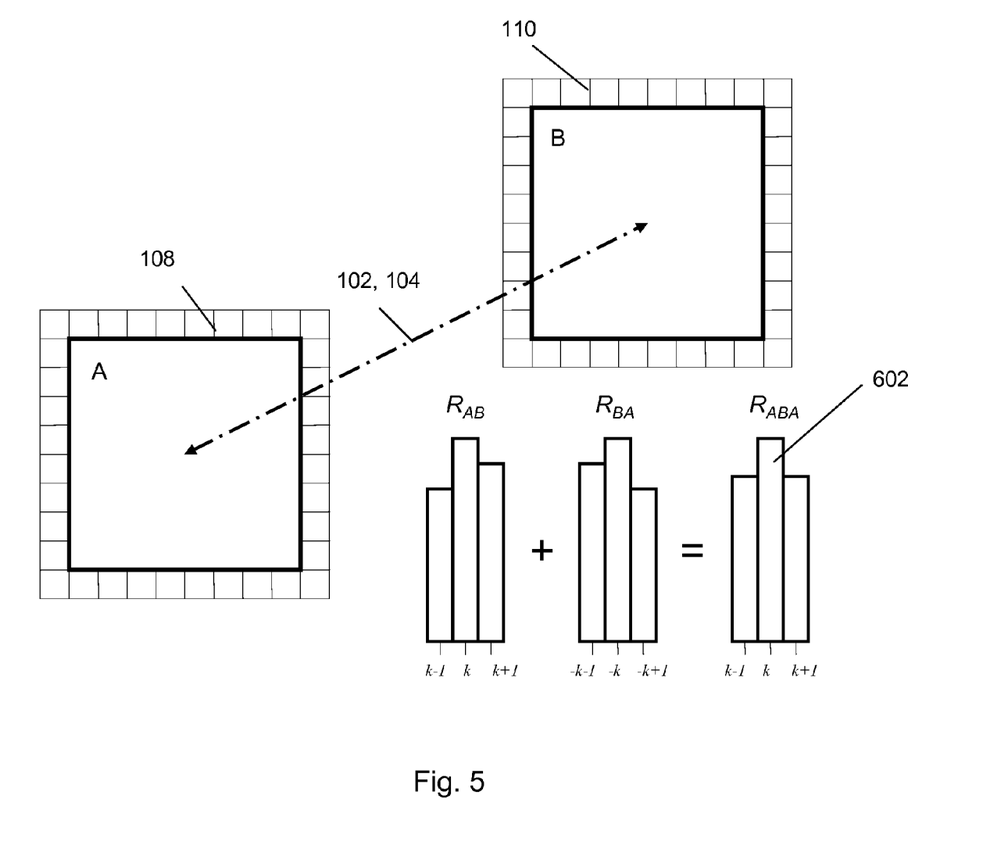
FIG. 5 shows a schematic diagram of a step of combining forward and reverse correlation data.

FIG. 5 shows the result of combination of forward correlation 102 and reverse correlation 104, with enforced symmetry 602 in the combined correlation peak. Correlation peak symmetry can be locally enforced based on the notion that reverse correlation should give a relevant correlation peak mirrored around the true peak location. This is illustrated in FIG. 5 for integer disparity. In FIG. 5, $R_{AB}$ represents correlating the A block with the same sized blocks around B. $R_{BA}$ is the relevant reverse, or backward, correlation with the same amount of distortion around the true correlation peak, but in the opposite direction. Combining the values around the two peaks (e.g., simple averaging of correlation values) results in a symmetric correlation peak 602.

Figure 6:
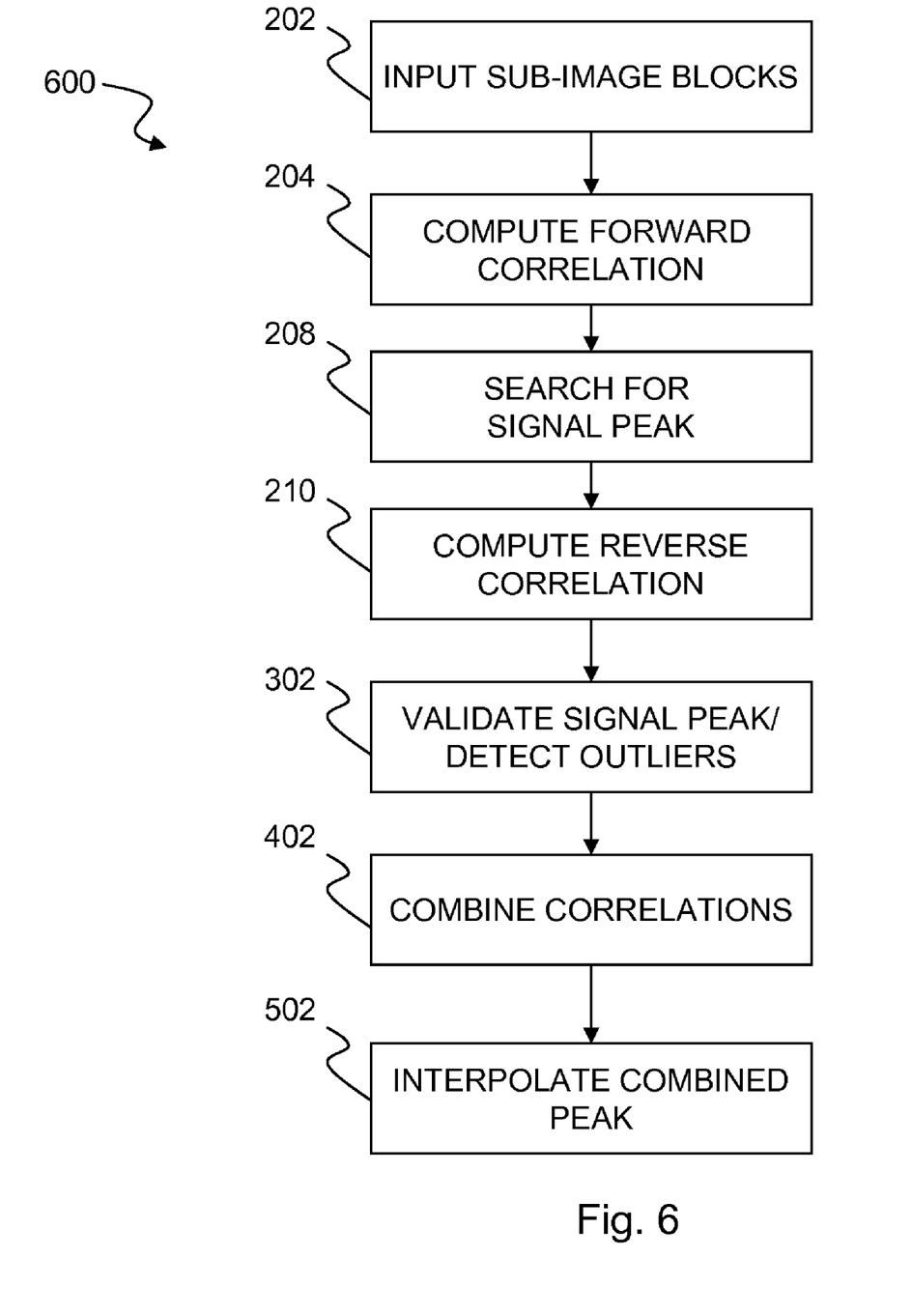
FIG. 6 shows additional optional steps in a method for forward and reverse correlation, including a step of interpolating a signal peak.

FIG. 6 shows a flow diagram 600 with an additional optional step for an embodiment of a forward and reverse correlation technique. After completion of the combination step 402 of FIG. 4, the methods described herein may include a step 502 involving the interpolation of the combined peak using an interpolation function, which may be any suitable mathematical function for performing an interpolation about a peak, such as an Airy function, a Gaussian distribution, a parabolic function, or the like. In embodiments the interpolation functions are non-separable in the x- and y-variables.

Referring again to FIGS. 1 and 2, in one embodiment of a correlation calculation, at an evaluated (k, l) disparity, the discrete correlation, covariance, and normalized correlation of two image blocks including M×N pixels are computed as follows:

$$R_{k,l} = \frac{1}{MN} \sum_{i=1}^{M} \sum_{j=1}^{N} I'_{i,j} I''_{i+k,j+l} \tag{1}$$

-continued $$C_{k,l} = \frac{1}{MN} \sum_{i=1}^{M} \sum_{j=1}^{N} I'_{i,j} I''_{i+k,j+l} - \mu' \mu''_{k,l} \quad (2)$$

$$\rho_{k,l} = \frac{C_{k,l}}{\sqrt{v'}\sqrt{v_{k,l}}} \quad (3)$$

where I' and I" are the first and second image frames, $\mu'$ and $\mu_{k,l}$" are the mean pixel intensities in the first and second image blocks, and v' and $V_{k,l}$" are the variances of pixel intensities in the first and the (k, l) relevant second sub-image blocks. Sub-pixel correlation peak location may be estimated from a small-neighborhood around the true signal, as described in T. Roesgen (2003, September) "Optimal sub-pixel interpolation in particle image velocimetry," *Experiments in Fluids* 35 (3): 252-256, assuming that the correlated features are larger than a pixel; otherwise, the neighborhood of the signal contains only rms noise. However, even if the features cover more than a single pixel, false correlations may distort correlation values around the signal peak.

The methods disclosed in connection with FIGS. 1 through 6 may reduce or eliminate artifacts of false correlation peaks around the true signal peak in cases of disparity with integer pixel value. At fractional disparity, the methods may still yield favorable results, although in some cases with potentially diminished effectiveness due to the fact that symmetry is not enforced around the correct center. Where this mismatch arises, a number of additional reverse correlation calculations (e.g., four) with single pixel offsets in the location of the search region may be advantageously performed, and the final disparity to be recovered may be modeled as, for example, the linear combination of the (four) disparities recovered from the combined correlation planes. While a linear model is one suitable approach, it will be understood that other models, such as higher order models, may be employed. Suitable analogs may be found in the techniques employed to remove bias in optical flow computations, such as described in Davis C Q, Freeman D M, "Statistics of subpixel registration algorithms based on spatiotemporal gradients or block matching," *Optical Engineering* 37 (4): 1290-1298 APRIL 1998 the entirety of which is incorporated by reference herein.

In embodiments, one can apply an iterative method where a fractional window offset, plus deformation, aims to resample the search frame (and potentially also the template frame) to give exactly integer disparity between the frames, so the outlined method of enforcing correlation peak symmetry will be close to exact, apart from image interpolation artifacts.

Figure 7:
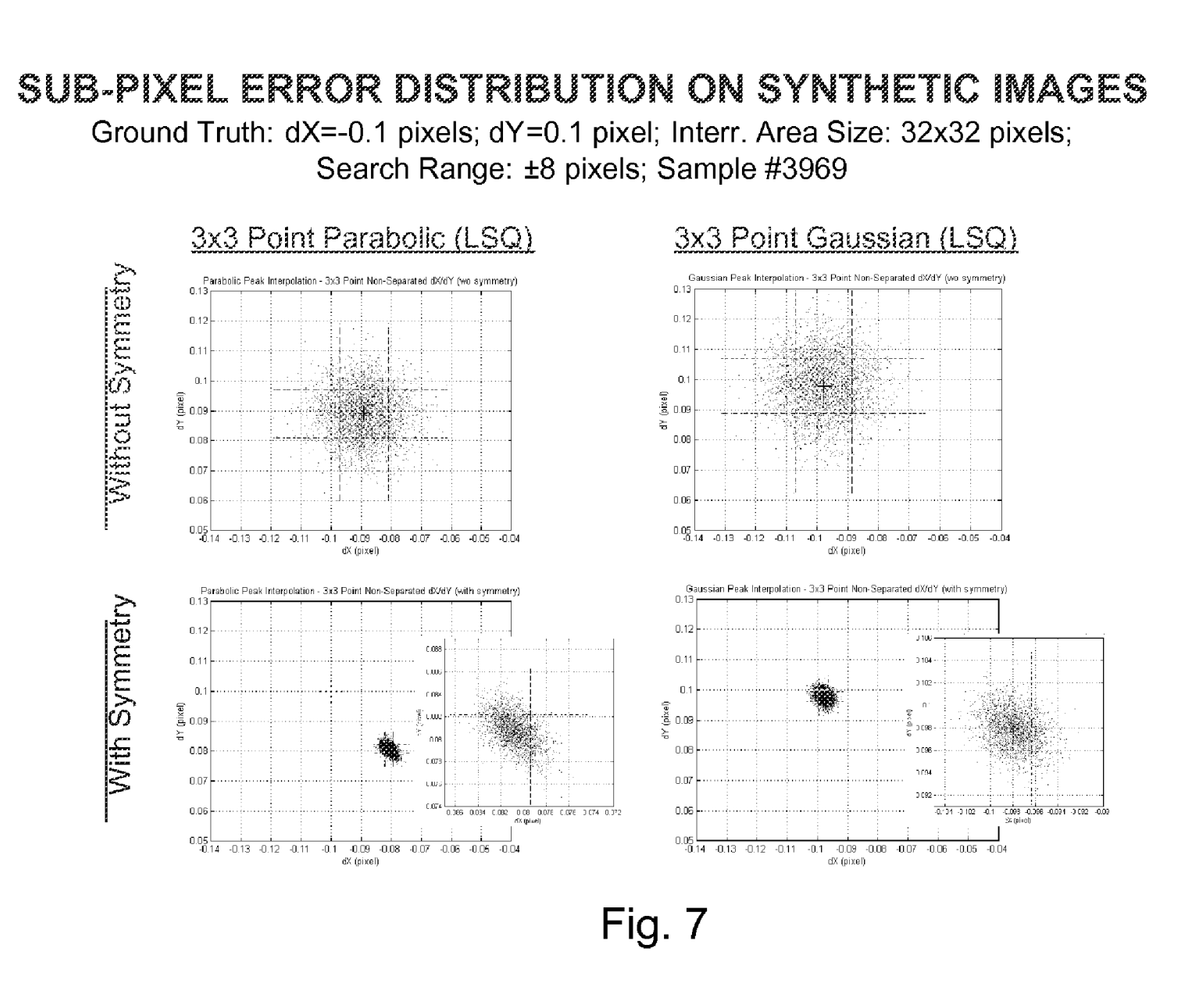
FIG. 7 shows sub-pixel error distribution on a set of synthetic image data.

FIG. 7 shows how the proposed method may be employed to improve detection of image disparities with sub-pixel accuracy relative to a conventional technique that employs only forward correlation. In addition to enforcing correlation peak symmetry, the methods disclosed herein may include using an interpolating function that is non-separable in x and y. For example, on a synthetic sample image, the following Gaussian interpolating function was used in the computation:

$$f(x,y) = e^{A(x-x_o)^2 + B(y-y_o)^2 + C(x-x_o)(y-y_o) + D} \quad (4)$$

Provided herein are methods and systems for identifying a valid correlation peak or making a template to reference correlation between a first reference image and a second image in an image processing algorithm. The methods and systems may include computing a first correlation, such as a covariance, normalized correlation, normalized covariance, or the like, using image data associated with the first image as a template or reference block and using image data associated with the second image as a search area or target. The methods and systems may further include determining a correlation peak, signal peak, candidate correlation peak, or the like representing motion, average motion, a motion vector, image registration or image disparity between the first image and the second image. The methods may further include, relative to the previously determined correlation peak a second, reverse correlation statistic using image data associated the second image as a template/reference block and using image data associated with the first image as a search area/target block. The methods and systems may further include validating the reverse correlation peak, such as comparing whether the reverse correlation peak is close enough (e.g., in displacement or value) to the forward correlation peak. In optional embodiments, the methods and systems may include combining the first, forward correlation peak with the second, reverse correlation peak to determine a combined peak and interpolating the combined peak using an interpolation function.

In certain embodiments, methods and systems are provided for identifying a valid correlation peak between a pair of images in an image processing algorithm. The methods and systems may include determining a forward correlation peak between a first image and a second image, calculating the reverse correlation peak between the second image and the first image, validating the reverse correlation peak or comparing whether the reverse correlation peak is close enough to the forward correlation peak, and combining the forward correlation peak and the reverse correlation peak calculations to calculate a combined correlation peak.

In certain embodiments methods and systems are provided for enforcing correlation peak symmetry between a pair of images in an image processing algorithm. The methods and systems may include determining a forward correlation peak between a first image and a second image, calculating the reverse correlation peak between the second image and the first image, and enforcing symmetry between the forward correlation peak and the reverse correlation peak to acquire a combined correlation peak.

In certain embodiments methods and systems are provided for obtaining a correlation in an image processing algorithm. The methods and systems may include determining a forward correlation peak between a first image and a second image, calculating a plurality of reverse correlation peaks between the second image and the first image, and combining the forward correlation peak and the reverse correlation peak calculations to calculate a combined correlation peak. In embodiments various forms of correlation may be used, such as linear correlations.

In certain embodiments methods and systems are provided for determining an interpolated correlation in an image processing algorithm. The methods and systems may include computing a first, forward correlation, using image data associated a first image as a template/reference block and using image data associated with the second image as a search area/target. The methods and systems may further include determining a correlation peak, signal peak, candidate correlation peak, or the like representing motion, average motion, a motion vector, image registration or image disparity between the first image and the second image. The methods may further include, relative to the previously determined correlation peak a second, reverse correlation statistic using image data associated the second image as a template/reference block and using image data associated with the first image as a search area/target block. The methods and systems may further include validating the reverse correlation peak, such as comparing whether the reverse correlation peak is close enough to the forward correlation peak. In optional embodiments, the methods and systems may include combining the first, forward correlation peak with the second, reverse correlation peak to determine a combined peak and interpolating the combined peak using an interpolation function.

Provided herein are methods and systems by which the inherently asymmetric nature of the signal peak of a two-dimensional correlation, or more generally, a multi-dimensional correlation, such as a covariance or normalized correlation is corrected by combining correlation information from the original correlation plane (referred to herein as forward correlation) with the investigated signal peak relevant reverse, or backward, correlation. The two correlations give consistent correlation peak information at the true image disparity relevant location, such that a valid signal peak can be distinguished from an outlier. In embodiments described herein, various possible combinations of correlation information are disclosed. A sub-pixel peak interpolation method is disclosed to handle information with enforced symmetry that leads to enhanced sub-pixel accuracy in locating the center of a signal peak. The inherent bias due to the discrepancy between the fixed resolution with which correlation information is available and a possible fractional peak location is resolved by composing a model on the introduced bias, and correcting it by multiple integer/fractional reverse or backward correlation.

In embodiments, provided herein are methods for forward and reverse correlation of signal peaks in image processing systems, including methods for using reverse correlation to validate a forward correlation peak. The methods and systems optionally include steps for enforcing correlation peak symmetry by combining forward and reverse correlation data. The methods and systems optionally include using multiple reverse correlation calculations. The methods optionally include using an interpolation function, such as a non-separable correlation peak interpolation function.

The methods and systems described herein can provide for improved correlation of image data for a variety of purposes. In one embodiment, one or more of the methods and systems disclosed herein can be used for resolution of images in stereo vision systems or other vision systems in which it is necessary to resolve multiple images into three-dimensional data. In another embodiment the methods and systems described herein can be used for velocimetry—measuring the velocity of one or more objects that are captured in a pair of images. Another application of the methods and systems disclosed herein is motion detection. The methods and systems described herein can also be used for object tracking. More generally, the methods and systems described herein can be used in any image registration application where sub-image correlation is used and accurate image motion estimation is desired. This may include applications related to image mosaics, medical and dental imaging, 3D reconstruction from multiple images (e.g. determining shape from motion), and others, in addition to the applications described elsewhere herein.

It will be appreciated that the various steps identified and described above may be varied, and that the order of steps may be changed to suit particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

It will be appreciated that the above processes, and steps thereof, may be realized in hardware, software, or any combination of these suitable for a particular application. The hardware may include a general purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a camera system and/or a computer in a number of ways, or all of the functionality may be integrated into a dedicated, standalone image capture device or other hardware. All such permutations and combinations are intended to fall within the scope of the present disclosure.

It will also be appreciated that means for performing the steps associated with the processes described above may include any of the hardware and/or software described above. In another aspect, each process, including individual process steps described above and combinations thereof, may be embodied in computer executable code that, when executing on one or more computing devices, performs the steps thereof.

While the invention has been described in connection with certain preferred embodiments, other embodiments may be understood by those of ordinary skill in the art and are encompassed herein.

What is claimed is:

1. A method of making a correlation between a first image and a second image in an image processing algorithm, comprising:

computing a first correlation using image data associated with the first image as a template and using image data associated with the second image as a search area;

determining a first correlation peak from the first correlation, the first correlation peak representing an image disparity from the first image to the second image;

computing a second correlation using image data associated the second image as a template and using image data associated with the first image as a search area;

determining a second correlation peak from the second correlation, the second correlation peak representing an image disparity from the second image to the first image; and validating the first correlation peak by comparing the second correlation peak to a threshold value, the threshold value based upon the first correlation peak.

2. The method of claim 1 further comprising combining the first correlation peak with the second correlation peak to determine a combined peak.

3. The method of claim 2 wherein combining includes element-by-element averaging of data for the respective correlation peaks.

4. The method of claim 2 wherein combining includes element-by-element multiplication of correlation values.

5. The method of claim 2 wherein combining includes combining correlation tables as if the correlation tables were from the same image data source.

6. The method of claim 2 wherein combining includes interpolating the combined peak using an interpolation function.

7. The method of claim 6 wherein the interpolation function is non-separable in the number of dimensions of the image data.

8. The method of claim 6 wherein the interpolation function is based on an Airy function.

9. The method of claim 6 wherein the interpolation function is based on an actual point spread function.

10. The method of claim 6 wherein the interpolation function is based on a spline.

11. The method of claim 6 wherein the interpolation function is based on a Gaussian distribution.

12. The method of claim 1 wherein computing a second correlation includes computing the second correlation relative to the first correlation peak.

13. The method of claim 1 further comprising enforcing correlation symmetry by iteratively introducing a fraction offset to at least one of the first image and the second image until symmetry is achieved in a combined correlation peak of the first correlation and the second correlation.

14. A system comprising:

first computing means for computing a first correlation using image data associated with the first image as a template and using image data associated with the second image as a search area;

second computing means for determining a first correlation peak from the first correlation, the first correlation peak representing an image disparity from the first image to the second image;

third computing means for computing a second correlation using image data associated the second image as a template and using image data associated with the first image as a search area;

fourth computing means for determining a second correlation peak from the second correlation, the second correlation peak representing an image disparity from the second image to the first image; and fifth computing means for validating the first correlation peak by comparing the second correlation peak to a threshold value, the threshold value based upon the first correlation peak.

* * * * *

UNITED STATES PATENT AND TRADEMARK OFFICE
CERTIFICATE OF CORRECTION

PATENT NO.       : 7,606,424 B2                                          Page 1 of 1
APPLICATION NO.  : 11/421573
DATED            : October 20, 2009
INVENTOR(S)      : Janos Rohaly It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Twelfth Day of October, 2010

David J. Kappos
*Director of the United States Patent and Trademark Office*